Nov. 17, 1953
S. R. KNAPP
2,659,441
HYDRAULICALLY ACTUATED FISHING TOOL FOR RECLAIMING BROKEN DRILL PARTS, ETC., FROM WELLS
Filed Jan. 12, 1951
2 Sheets-Sheet 2
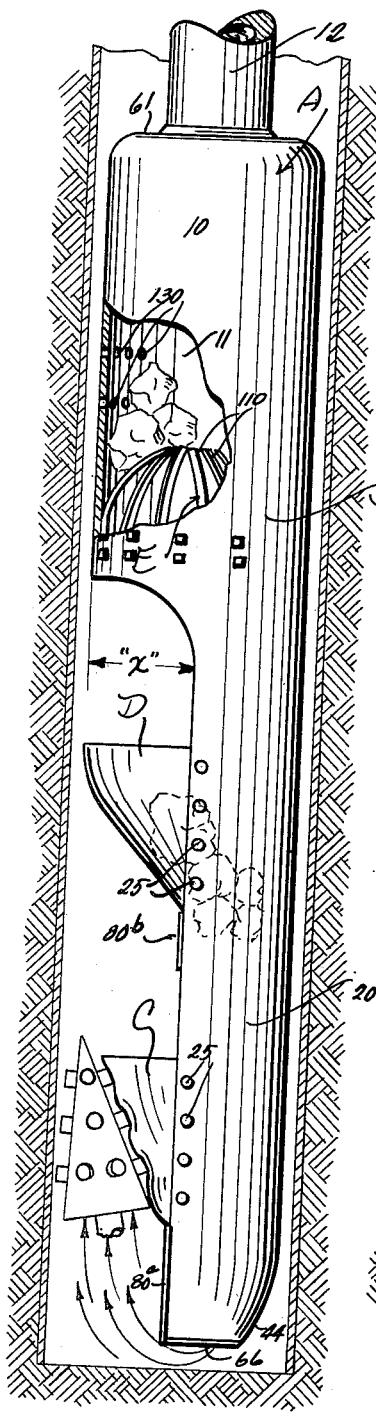
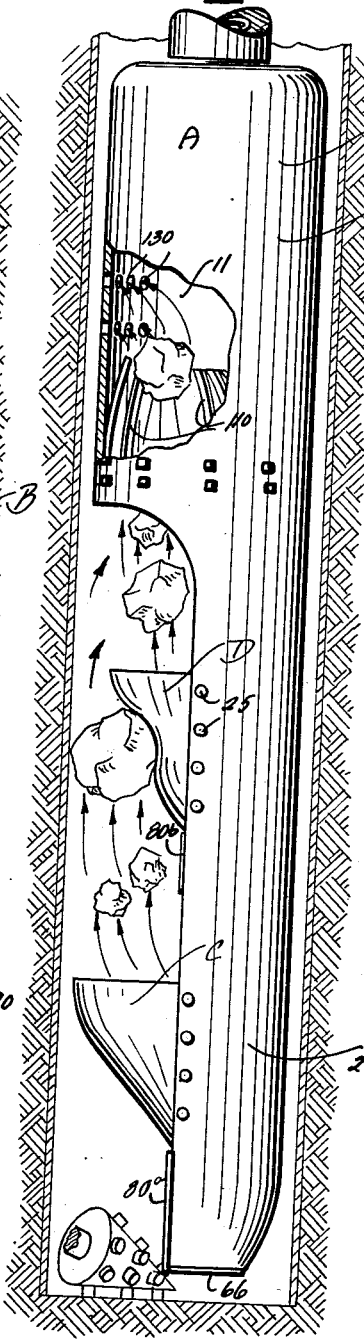
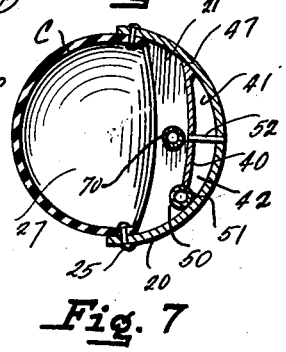
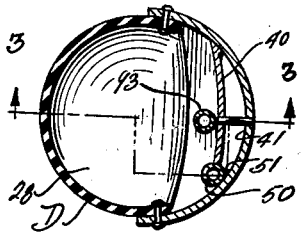
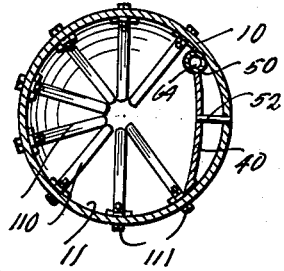
INVENTOR.
SETH R. KNAPP
ATTORNEYS.

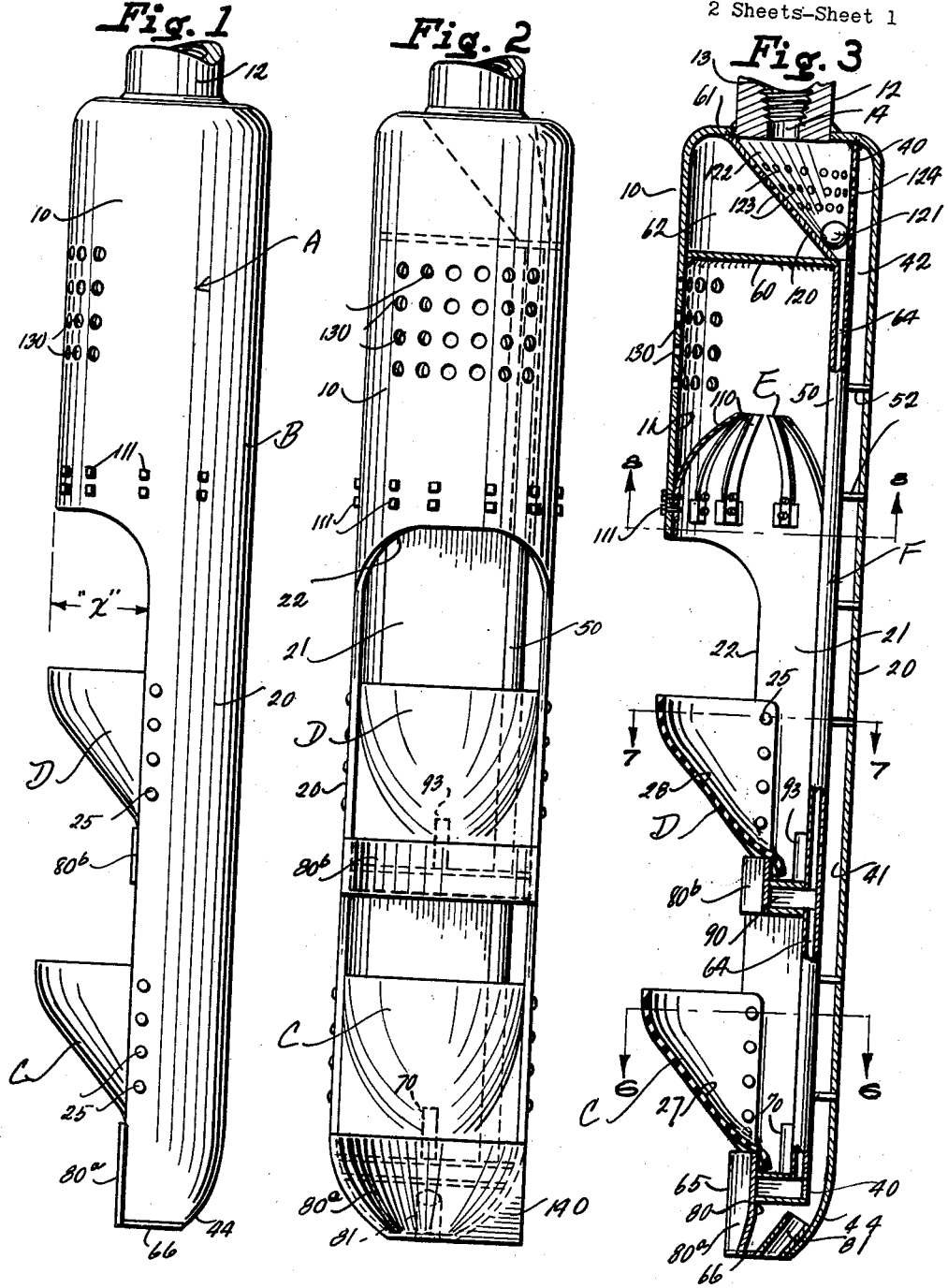

Patented Nov. 17, 1953

2,659,441

UNITED STATES PATENT OFFICE 2,659,441

HYDRAULICALLY ACTUATED FISHING TOOL FOR RECLAIMING BROKEN DRILL PARTS, ETC., FROM WELLS

Seth R. Knapp, Elk City, Okla.

Application January 12, 1951, Serial No. 205,720

12 Claims. (Cl. 166—19)

1

This invention relates to improvements in tools for the reclamation of broken drill parts, etc. from oil wells and the like.

The primary object of this invention is the provision of a fishing tool constituting an improvement over the fishing tool described and claimed in my co-pending application Serial Number 124,832, now Patent Number 2,652,119, filed November 1, 1949, in that the improved tool can more readily reclaim the junk, drill parts, etc. from the bottoms of wells under varying conditions.

A further object of this invention is the provision of an improved rotary type hydraulic well fishing tool having a reclaiming portion, the upper end of which is cylindrical and provided with a passageway of a size to receive the reclaimed parts and debris, and having a depending segmental portion laterally thereof with a plurality of collapsible retaining means at the open side projecting into the space which directly faces the well bore. By this arrangement the jet stream of fluid can lift larger particles for reclaiming than has heretofore been possible, and the debris to be reclaimed can be more efficiently and expeditiously lifted and fished out of the well bore.

A further object of this invention is the provision of an improved rotary type hydraulic well fishing tool constructed and arranged to most efficiently reclaim with ease and minimum expense the debris and broken drilling parts from the bottom of an oil well.

Other objects and advantages of the invention will be apparent from the following detailed description.

In the accompanying drawings, forming a part of this specification, and wherein similar reference characters designate corresponding parts throughout the several views, Figure 1 is a side elevation of the improved fishing tool.

Figure 2 is a front elevation of the improved fishing tool.

Figure 3 is a cross sectional view taken through the improved fishing tool in various planes substantially on the line 3—3 shown in Figure 7.

Figure 4 is a side elevation of the improved fishing tool showing operation thereof for the preliminary clearing of debris from the bottom of an oil well.

Figure 5 is a side elevation, partly in section, showing the improved tool in a later stage of operation for the reclaiming of a drill part.

Figures 6, 7 and 8 are cross sectional views taken substantially on the respective lines 6—6; 7—7 and 8—8 shown in Figure 3.

In the accompanying drawings, wherein for the purpose of illustration is shown only a preferred embodiment of the invention, the letter A may generally designate a fishing tool. It consists of a housing or frame structure B to which a rotary drill line may be attached in a manner conventional in the art. Improved collapsible baskets C and D are provided upon the frame structure or housing B, and debris retaining means E is provided above the baskets C and D for purposes to be subsequently described. Means F is provided for conveying and ejecting water or other fluid through a variety of nozzles in the device.

The housing, shell or frame B is in the form of a tubular casing, including a cylindrical body portion 10 at the upper end thereof having a compartment 11 wherein the debris retaining means E is disposed. The upper end of the body portion 10 is provided with a nipple 12 having a screw threaded socket 13 therein to receive a conventional rotary drilling stem through which the wash fluid travels into the passageway 14 and thence into the housing B.

The housing B, for the major length thereof, is cut away at one side. The term "cut away" is used because the tubular structure ordinarily is full cylindrical length and then cut away to provide a lower segmental portion 20 preferably extending the major length of the housing. The portion 20 is segmental in cross section with a compartment 21 provided with a so-called "window opening" 22 directly facing the bore wall of the well within which the tool is used. The diameter of the body portion 10 may vary, but generally it fairly fills the well bore, as shown in Figures 4 and 5, leaving sufficient space to enable its rotation. In Figure 1 is shown a distance "X" constituting the space from the edge of the window opening to the outer peripheral edge of the body 10, and in this space X are disposed in projecting relation the collapsible pocket structures C and D, to be subsequently described.

The compartment 21 of the segmental portion 20 opens upwardly into the compartment 11 of the main body portion 10 of the casing structure.

The baskets C and D are preferably of rubber or synthetic flexible and collapsible material of such nature that the portions projecting into the space X may be collapsed almost completely into the compartment 21 of the segmental portion 20 during jet action of the tool when the debris is being washed upwardly as shown in Figures 4 and 5 of the drawings, and as described in my co-pending application Serial Number 124,832, above identified.

The baskets C and D are substantially identical in construction. In the form shown the margins overlap the margins of the segmental portion 20 upon the inner surface of the segment, tion the window opening 21, and are secured thereat as by riveting 25. The baskets C and D have side and front walls defining compartments 27 and 28 respectively, which are closed at the bottoms thereof and top opening into the compartment 21 of the segment.

In the operation of the fishing tool of my co-pending application Serial Number 124,832, now Patent Number 2,652,119, it was found that in some cases the well bore at its bottom was clogged with large pieces of earth, bolders and formation caved in from the well bore or from the sides of the well. Generally this debris at the bottom of the well covered the broken well drilling parts whose reclamation was desired. These bolders or other debris, it was found with the single basket type of fishing tool shown in my above identified application, filled the basket before the drilling equipment could be reached. It was then necessary to perform extended and expensive operations in order to reclaim the broken drilling parts. To obviate this, in the present fishing tool, I have provided a plurality of baskets or holding means, and arranged the flow paths of the article lifting fluid streams so that the larger bolders will be forced into the upper baskets or holding structures, and the tool operated so that upon reaching the level of the broken drilling parts, the latter will then be washed by the jet action of the fluid into the lowermost basket, and in some cases the upper basket.

Referring to the means F for regulating the jet action and flow of the article lifting fluid for the performance of the above, I have provided within the compartment of the casing structure B along the length of the main body portion 10 and the segmental portion 20, a transversely curved fluid guiding wall designated at 40 in the drawings, spaced from the inner wall surface 41 of the housing or tube B to define a crescent-shaped flow passageway 42 extending from the extreme upper end of the body portion 10 to the lower curved end 44 of the tube frame B, as shown in Figure 3. The water is forced under considerable pressure through the passageway 42 and that is the reason for placing the convex side of the arcuate wall 40 facing the passageway 42. The longitudinal edges of the wall 40 are preferably welded at one margin 47 thereof to the tube B, and the other end may be welded to an auxiliary flow tube 50, and the latter may also be welded at 51 to the inner wall of the housing B. The wall 40 is reinforced by means of stay bolts or rivets 52. They may be screw threaded and welded or otherwise secured in the relation shown throughout the drawings, to hold the spacing of the wall 40 with respect to the facing segment of the housing B.

The auxiliary flow tube 50 extends through the major length of the housing B. In the body portion 10 is disposed a baffle wall 60, spaced from the top wall 61 of the body 10 and defining a water receiving space 62 between these walls. The tube 50 extends from this wall 60 downwardly through the major length of the housing B; its passageway 64 opening into a basin 65 provided transversely across the segment 20 just above the extreme bottom wall 66, so that the fluid passing through the passageway 64 may enter this basin. The basin 65 is located immediately below the collapsible pocket C, as shown in Figure 3. The cross walls which define the basin 65 may be welded in place and are spaced to define a compartment extending the width of the segment 20. The basin 65 has a vertically disposed nozzle tube 70 extending upwardly into the segment 20, facing the pocket wardly into the segment 20, facing the pocket compartment 27, for the purpose of washing out the pocket 27, during the initial action of recovery, any debris which may have a tendency to settle in the basket C, as will be subsequently described.

The main channel 42 for the fluid opens into the compartment 80 between the basin 65 and the extreme bottom wall 66. Therein is provided a nozzle 81, the passageway of which is inclined to the vertical and openings at the bottom wall 66 so that a jet of fluid therefrom will be directed at an angle into the bottom of the well and thence below the space X for the efficient washing of debris and drill parts upwardly in the direction of the space X. The curvature at the lower end of the segment 20, and the nozzle, properly direct the jet stream for accomplishing its maximum function of dislodging debris and drill parts and lifting them in a cooperative action which will be well understood by those skilled in the art.

A second basin 90 is provided upon the segment 20, of the same construction as the basin 65, but located immediately below the pocket D. The basin 90 opens into the auxiliary flow tube 50, so the jet stream of fluid therefrom will enter the basin 90 and exhaust therefrom through a vertically disposed nozzle 93 facing upwardly in the pocket 28 of the basket D, as shown in Figure 3. It is to be noted that the compartments of the basins 65 and 90 have the passageway 64 of the flow tube communicating therewith at one end of each of the basin compartments, and the nozzles 70 and 93 are located centrally of the basin compartments.

It is to be noted that the walls 80$^a$ and 80$^b$ below the baskets C and D are curved inwardly in order to facilitate removal of large objects and to strengthen the structure.

Referring to the debris retaining means E, the same consists of a plurality of arcuate spring retaining fingers 110 detachably secured as by bolt means 111 within the lower end of the compartment 11. They are arcuate upwardly in converging relation, with their convex sides facing upwardly. They will readily spring apart to permit the ingress of boulders and other debris into the compartment 11 above the fingers, wherein such is retained by the fingers which have a spring action and have a tendency to return to normal positions.

A check valve guiding wall 120 is provided in the compartment 62, defining a chamber 122 which slopes in convergent relation from the wall 61 to the upper end of the auxiliary flow tube 50, for guiding a ball type check valve 121 into position, for closing off the passageway 64 to flow of fluid. This funnel-shaped wall structure 120 is suitably apertured, at 123, in order that the fluid passing downwardly through the drill stem and entering the compartment defined by the funnel wall will pass freely into the compartment 62, from whence it flows in unrestricted fashion into the main flow passageway 42. Of course the wall structure 40 where it faces the compartment 122 may also be apertured at 124 to permit water to enter the flow passageway 42.

In order to permit egress of fluid from the compartment 11, the body 10 is apertured at 130 above the means E.

Referring to the cycle of operation of the tool, it is to be noted that rotary action of the housing B is necessary. At its lower end the segmental portion 20 of the housing B is provided with a triangular scraping blade 140 at the leading edge of the segment, in the same plane as the wall 80a. This scrapes the debris at the bottom of the well bore into position for receiving jet action of the fluid issuing from the nozzle 81. It is to be noted that the diametrically opposite side of the lower end of the segment does not obstruct the fluid from passing around to the back of the blade 140.

Having lowered the tool and started its rotation, fluid passes downwardly into the top of the housing B, flowing not only through the main channel 42 and issuing at the nozzle 81, but also flowing downwardly through the auxiliary tube 50 and its passageway 64 and thence issuing through the nozzle jets 70 and 93 into the pockets 27 and 28 of the baskets C and D. Forceful jet action of the fluid will lift and dislodge larger boulders and particles upwardly past the pockets C and D. Since the fluid is passing through the jets 70 and 93 into pockets 27 and 28, the jet action will prevent debris from dropping into the baskets C and D. It will be washed upwardly in the jet stream, as shown in Figure 4, past the spring fingers constituting the means E and into the compartment 11. The larger particles are retained therein. Ordinarily such will be boulders and cavings from the well bore, but it may be that well drilling parts will also be trapped in the compartment 11. After a predetermined period of time, the check valve 121 is dropped through the drill stem and passes directly into the compartment 122 wherein it is guided by the funnel wall to a position for closing off the passageway 64 of the auxiliary flow tube 50, as shown in Figure 3. The fluid will pass through the openings 123 and 124 into the regular flow channel 42. The valve 121 has now stopped the jet action of the fluid through the nozzles 70 and 93 and the pockets C and D are in position to receive the junk and drill parts therein, in the manner shown in Figure 5.

Any means may be provided to dislodge the reclaimed debris and parts from above the fingers 110. These fingers are readily detachable and may also be sprung apart to enable such dislodgement.

It is within the contemplation of this invention to provide more than two of the collapsible baskets C and D if found necessary. It is also to be noted that during the initial action the jet flow of the fluid through the nozzles 70 and 93 will increase the lifting flow of the fluid for the lifting of the larger particles through the space X and upwardly past the retaining fingers 110.

Various changes in the shape, size and arrangement of parts may be made to the form of invention herein shown and described without departing from the spirit of the invention or the scope of the following claims.

I claim:

1. A tool for reclaiming drilling equipment and debris from well bores comprising a rotary reclaiming frame, retaining means upon said frame, a second retaining means upon the frame above the first mentioned retaining means, means for directing a stream of fluid in the vicinity of the lowermost retaining means to prevent the retention of drill parts and debris therein, means for selectively shutting off said flow action, and other means for directing flow action of fluid from a point below the lowermost retaining means upwardly for lifting drill parts and debris into both of the retaining means.

2. In a tool for capturing broken drill parts and debris from a well bore the combination of a rotary tubular frame, upper, lower and intermediate retaining means supported upon the frame for receiving and holding drill parts and debris washed upwardly thereinto, fluid directing means upon said frame for directing the flow of a fluid for the lifting of drill parts and debris from the lower part of a well bore upwardly into any of said retaining means, means for directing flow of fluid at the retaining area of the lower and intermediate retaining means to prevent the lodging therein of well drilling parts and debris, and means for selectively shutting off the flow of fluid through the lower and intermediate retaining means.

3. In a tool for bailing out of a well bore well drilling parts and debris from the bottom of the well bore comprising a rotary supporting frame having a compartment therein provided with a lateral opening of a size to permit the passing therethru of drilling parts and debris facing the side of the well bore, the housing being reduced at the lateral opening to provide sufficient space between the opening and the facing side of a well bore to permit the passage upwardly through said space of well drilling parts and debris to be reclaimed, and a plurality of collapsible debris retaining baskets supported by said frame directly in said lateral opening and extending into said space at different levels along said space.

4. A tool for bailing out of a well bore well drilling parts and debris from the bottom of the well bore comprising a rotary supporting frame having a compartment therein provided with a lateral opening of a size to permit the passing therethru of drilling parts and debris facing the side of the well bore, the housing being reduced at the lateral opening to provide sufficient space between the opening and the facing side of a well bore to permit the passage upwardly through said space of well drilling parts and debris to be reclaimed, a plurality of collapsible debris retaining baskets supported by said frame directly in said lateral opening and extending into said space at different levels along said space, and means carried by the frame for directing a jet nozzle of fluid against the bottom of a well bore below said baskets for lifting well drilling parts and debris upwardly along said baskets and into said baskets.

5. A tool for bailing out of a well bore well drilling parts and debris from the bottom of the well bore comprising a rotary supporting frame having a compartment therein provided with a lateral opening facing the side of the well bore, the housing at the lateral opening being sufficiently spaced from the facing side of the well bore to permit the passage upwardly through said space of well drilling parts and debris to be reclaimed, a plurality of collapsible debris retaining baskets supported by said frame extending into said space at different levels along said space, means carried by the frame for directing a jet nozzle of fluid against the bottom of a well bore below said baskets for lifting well drilling parts and debris upwardly past said baskets for the dropping of the same into said baskets, another means for directing flow of fluid upwardly into said baskets to prevent the settlement of washed-up parts thereinto, means to selectively shut off the flow of fluid through the said baskets, and means above said baskets for reclaiming parts and debris washed upwardly to a level above said baskets.

6. A rotary tool for capturing broken drill parts and other junk from a well bore comprising a tubular body portion having a reduced extension depending therefrom at one side of the axis of the well bore to provide a space the width of which is sufficient to permit the passage upwardly therethrough of drill parts and junk to be reclaimed from a well bore, holding means in the tubular portion above said reduced portion for receiving drill parts and junk washed upwardly into the tubular body portion, a collapsible upwardly opening basket structure carried by the reduced portion extending into said space, fluid directing means for directing a flow of washing fluid for raising debris from the well bore upwardly past said basket and into the holding means first mentioned, a second fluid directing means upon the housing for directing flow of fluid upwardly through the basket to prevent the lodgement of drill parts and debris therein, and means for selectively shutting off the second flow means to permit the lodgement of drill parts and debris in said basket.

7. A tool for capturing broken drill parts and other debris from the bottom of a well bore comprising a housing structure including an upper tubular body portion and an elongated depending segmental portion at one side thereof having a chamber therein opening into the compartment of the tubular body portion, the lateral edges of the segmental portion being spaced from the outer adjacent surfacing of the well bore a distance sufficient to permit the passage upwardly through said space of well drill parts and debris to be reclaimed from the well bore, retaining means in the compartment of the tubular body portion above said segmental portion for receiving and holding drill parts and debris, a collapsible basket carried by said depending segment extending laterally into the space aforesaid below the reclaiming means and defining a pocket opening upwardly and facing said retaining means, means in the housing defining a fluid flow passageway therealong, a nozzle at the bottom of said passageway for directing a jet of fluid into the well bore below said collapsible basket for the lifting of well drill parts and debris upwardly past said basket, means for directing a second flow of fluid to a location below the basket, a nozzle for the second means for directing the flow of fluid therefrom in a jet stream upwardly through the pocket of said basket to prevent the lodgment in said backet of drill parts and debris, and control means for shutting off flow of fluid through the basket so as to permit the lodgment of drill parts and debris in said basket.

8. A tool for capturing broken drill parts and other debris from the bottom of a well bore comprising a housing structure including an upper tubular body portion and an elongated depending segmental portion at one side thereof having a chamber therein opening into the compartment of the tubular body portion, the lateral edges of the segmental portion being spaced from the outer adjacent surfacing of the well bore a distance sufficient to permit the passage upwardly through said space of well drill parts and debris, a collapsible basket carried by said depending segment extending laterally into the space afore- said below the retaining means and defining a pocket opening upwardly and facing said retaining means, means in the housing defining a fluid flow passageway therealong, a nozzle at the bottom of said passageway for directing a jet of fluid into the well bore below said collapsible basket for the lifting of well drill parts and debris upwardly past said basket, means for directing a second flow of fluid to a location below the basket, a nozzle for the second means for directing the flow of fluid therefrom in a jet stream upwardly through the pocket of said basket to prevent the lodgement in said basket of drill parts and debris, and control means for shutting off the flow of fluid through the basket so as to permit the lodgement of drill parts and debris in said basket, and a second collapsible basket similar to the first mentioned basket located below the first mentioned basket upon said segmental portion of the housing, and means for selectively directing a jet stream of fluid upwardly through said second basket to prevent the lodgement of drill parts and debris therein.

9. In a tool for capturing broken drilling parts and other debris from the bottom of a well bore the combination of a rotatable housing structure including an upper tubular body portion provided with a chamber therein and an elongated depending segmental laterally reduced portion connected with the upper tubular body portion, said elongated portion having a compartment therein communicating with the chamber of the tubular portion and having a lateral opening extending thru substantially the length thereof at the reduced side thereof, debris retaining means in the chamber of the upper tubular portion, a laterally collapsible basket of rubber-like material carried by the depending portion and extending laterally thru said opening into the space facing said opening, and means carried by said housing structure for projecting a jet of debris lifting fluid into a well bore below said basket for the lifting of drilling parts and debris upwardly along said basket to a point above the basket and into the basket and into the retaining means of said tubular portion.

10. In a tool for capturing broken drilling parts and other debris from the bottom of a well bore the combination of a rotatable housing structure including an upper tubular body portion provided with a chamber therein and an elongated depending segmental laterally reduced portion connected with the upper tubular body portion, said elongated portion having a compartment therein communicating with the chamber of the tubular portion and having a lateral opening extending thru substantially the length thereof at the reduced side thereof, debris retaining means in the chamber of the upper tubular portion, said housing structure having a passageway therealong for the passage of a fluid from the upper portion of the housing structure, a nozzle means at the lower end of the depending portion for the passage of said fluid therefrom into the well bore below said basket, means upon the housing structure for passing a second portion of fluid from the housing structure above said reclaiming means of the tubular portion along said housing structure and into the bottom of said basket for the lifting of debris from said basket and forcing it upwardly into the reclaiming means of the tubular portion, and means for shutting of the flow of fluid thru the last mentioned means without disturbing the flow of fluid thru the first mentioned fluid passageway.

11. In a tool for capturing and reclaiming broken drilling parts and other debris from the bottom of a well bore the combination of a rotatable housing structure including an upper cylindrical shaped body portion provided with a passageway therethrough of a size capable of receiving therein the usual broken and lost well drilling parts and debris to be fished out of a well bore and an elongated segmental shaped portion connected to and extending from the cylindrical body portion located substantially entirely at one side of the longitudinal axis of said housing structure, said segmental portion having a chamber therein open at its top to the passageway of the cylindrical portion and also opened laterally to any well bore in which it may be used at the chord side of the segment, a plurality of collapsible baskets mounted upon and at the open side of said segmental portion, each basket having a chamber opened upwardly, said baskets being extended into the space beyond the chord side of the segmental portion below the cylindrical body portion with the openings of said extended portions directly facing the passageway of the tubular portion, the portions of said baskets which project into said space being collapsible to permit the free upward movement of parts to be reclaimed past said baskets, and means in said housing structure for directing a stream of lifting fluid into the well bore below said baskets for the lifting of parts and debris to be reclaimed upwardly past and into said baskets.

12. A tool for capturing broken drilling parts and other debris as defined in claim 11 wherein a flexible retaining means for reclaimable parts and debris is provided in the passageway of the upper tubular portion for the upward passage therethrough of parts and debris to be reclaimed.

SETH R. KNAPP.

References Cited in the file of this patent
UNITED STATES PATENTS

| Number | Name | Date |
|---|---|---|
| 2,169,922 | Notley | Aug. 15, 1939 |
| 2,181,187 | Jennings | Nov. 28, 1939 |
| 2,525,954 | Schabarum | Oct. 17, 1950 |
| 2,556,849 | Nolley et al. | June 12, 1951 |